(12) United States Patent
Line et al.

(10) Patent No.: US 10,821,855 B2
(45) Date of Patent: Nov. 3, 2020

(54) TRANSLATION ASSEMBLY FOR A VEHICLE

(71) Applicant: Ford Global Technologies, LLC, Dearborn, MI (US)

(72) Inventors: Johnathan Andrew Line, Northville, MI (US); Joseph Michael Kish, Canton, MI (US); Spencer Robert Hoernke, Dundas (CA); Daniel Ferretti, Commerce Township, MI (US); S. M. Akbar Berry, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/266,282

(22) Filed: Feb. 4, 2019

(65) Prior Publication Data
US 2020/0247272 A1    Aug. 6, 2020

(51) Int. Cl.
| *B60N 2/00* | (2006.01) |
| *B60N 2/02* | (2006.01) |
| *B60N 2/07* | (2006.01) |
| *B60N 2/06* | (2006.01) |

(52) U.S. Cl.
CPC .......... *B60N 2/0232* (2013.01); *B60N 2/067* (2013.01); *B60N 2/072* (2013.01); *B60N 2/0722* (2013.01)

(58) Field of Classification Search
CPC .... B60N 2/0715; B60N 2/0705; B60N 2/067; B60N 2/0875
USPC ......................................... 248/424, 429, 430
See application file for complete search history.

(56) References Cited

U.S. PATENT DOCUMENTS

| 5,445,354 | A | 8/1995 | Gauger et al. | |
| 8,231,097 | B2 * | 7/2012 | Pinkal | B64D 11/0696 |
| | | | | 248/429 |
| 10,308,145 | B2 * | 6/2019 | Cziomer | B60N 2/085 |
| 10,562,411 | B2 * | 2/2020 | Higuchi | F16H 1/20 |
| 10,562,414 | B2 * | 2/2020 | Condamin | B60N 2/0843 |
| 10,640,014 | B2 * | 5/2020 | Taniguchi | B60N 2/067 |
| 2005/0253036 | A1 | 11/2005 | Li et al. | |
| 2017/0166091 | A1 | 6/2017 | Cziomer et al. | |

\* cited by examiner

*Primary Examiner* — Steven M Marsh
(74) *Attorney, Agent, or Firm* — David Coppiellie; Price Heneveld LLP

(57) ABSTRACT

A translation assembly includes a mounting bracket that couples a drive wheel and one or more passive wheels to a cassette. A motor is coupled to a drive shaft of the drive wheel. A biasing member is coupled between the cassette and the mounting bracket such that the drive wheel and the one or more passive wheels maintain physical contact with one another.

20 Claims, 6 Drawing Sheets

TRANSLATION ASSEMBLY FOR A VEHICLE

FIELD OF THE DISCLOSURE

The present disclosure generally relates to a translation assembly. More specifically, the present disclosure relates to a translation assembly for a vehicle.

BACKGROUND OF THE INVENTION

Vehicle consumers are constantly seeking greater functionality, flexibility, and comfort in the vehicles they interact with on a regular basis. An aspect of the greater functionality, flexibility, and comfort is adjusting a configuration of an interior or cabin of the vehicle. Accordingly, additional solutions are needed to provide consumers with the ability to adjust the configuration of the interior of the vehicles they interact with on a regular basis.

SUMMARY OF THE INVENTION

According to a first aspect of the present disclosure, a translation assembly includes a mounting bracket that couples a drive wheel and one or more passive wheels to a cassette. A motor is coupled to a drive shaft of the drive wheel. A biasing member is coupled between the cassette and the mounting bracket such that the drive wheel and the one or more passive wheels maintain physical contact with one another.

Embodiments of the first aspect of the present disclosure can include any one or a combination of the following features:
- a solenoid fixed to the cassette and having a pin that engages with the mounting bracket;
- the pin is operable to adjust friction between the drive wheel and the one or more passive wheels;
- the pin is operable between extended and retracted positions to adjust friction between the drive wheel and the one or more passive wheels;
- the extended position of the pin increases the friction between the drive wheel and the one or more passive wheels such that the cassette is maintained in a stationary position relative to a surface the one or more passive wheels rest upon;
- the biasing member is a coil spring that surrounds the pin of the solenoid;
- rotation of the drive wheel in one of a clockwise and a counter-clockwise direction induces rotation of the one or more passive wheels in the other of the clockwise and the counter-clockwise direction;
- the direction of rotation of the one or more passive wheels dictates a direction of lateral traversal of the translation assembly;
- the cassette is coupled to a seating assembly;
- the cassette is coupled to a component of a cabin of a vehicle;
- the drive wheel and the one or more passive wheels are provided with a rubberized coating on surfaces thereof; and
- a static coefficient of friction between the rubberized surfaces of the drive wheel and the one or more passive wheels is greater than about 1.0.

According to a second aspect of the present disclosure, a translation assembly includes a mounting bracket that couples a drive wheel and one or more passive wheels to a cassette. A motor is coupled to a drive shaft of the drive wheel. A solenoid is fixed to the cassette and includes a pin that engages with the mounting bracket. The pin is operable to adjust friction between the drive wheel and the one or more passive wheels.

Embodiments of the second aspect of the present disclosure can include any one or a combination of the following features:
- the pin is operable between extended and retracted positions to adjust the friction between the drive wheel and the one or more passive wheels;
- a biasing member is coupled between the cassette and the mounting bracket;
- the biasing member ensures that physical contact is maintained between the drive wheel and the one or more passive wheels; and
- the extended position of the pin increases the friction between the drive wheel and the one or more passive wheels such that the cassette is maintained in a stationary position relative to a surface the one or more passive wheels rest upon.

According to a third aspect of the present disclosure, a translation assembly includes a mounting bracket that couples a drive wheel and one or more passive wheels to a cassette. A motor is coupled to a drive shaft of the drive wheel. A solenoid is fixed to the cassette and includes a pin that is movable. The pin engages with the mounting bracket. The pin is operable between extended and retracted positions. A biasing member is coupled between the cassette and the mounting bracket such that the drive wheel and the one or more passive wheels maintain physical contact with one another.

Embodiments of the third aspect of the present disclosure can include any one or a combination of the following features:
- rotation of the drive wheel in one of a clockwise and a counter-clockwise direction induces rotation of the one or more passive wheels in the other of the clockwise and the counter-clockwise direction, wherein the direction of rotation of the one or more passive wheels dictates a direction of lateral traversal of the translation assembly; and
- the extended position of the pin increases the friction between the drive wheel and the one or more passive wheels such that the cassette is maintained in a stationary position relative to a surface the one or more passive wheels rest upon.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 4:
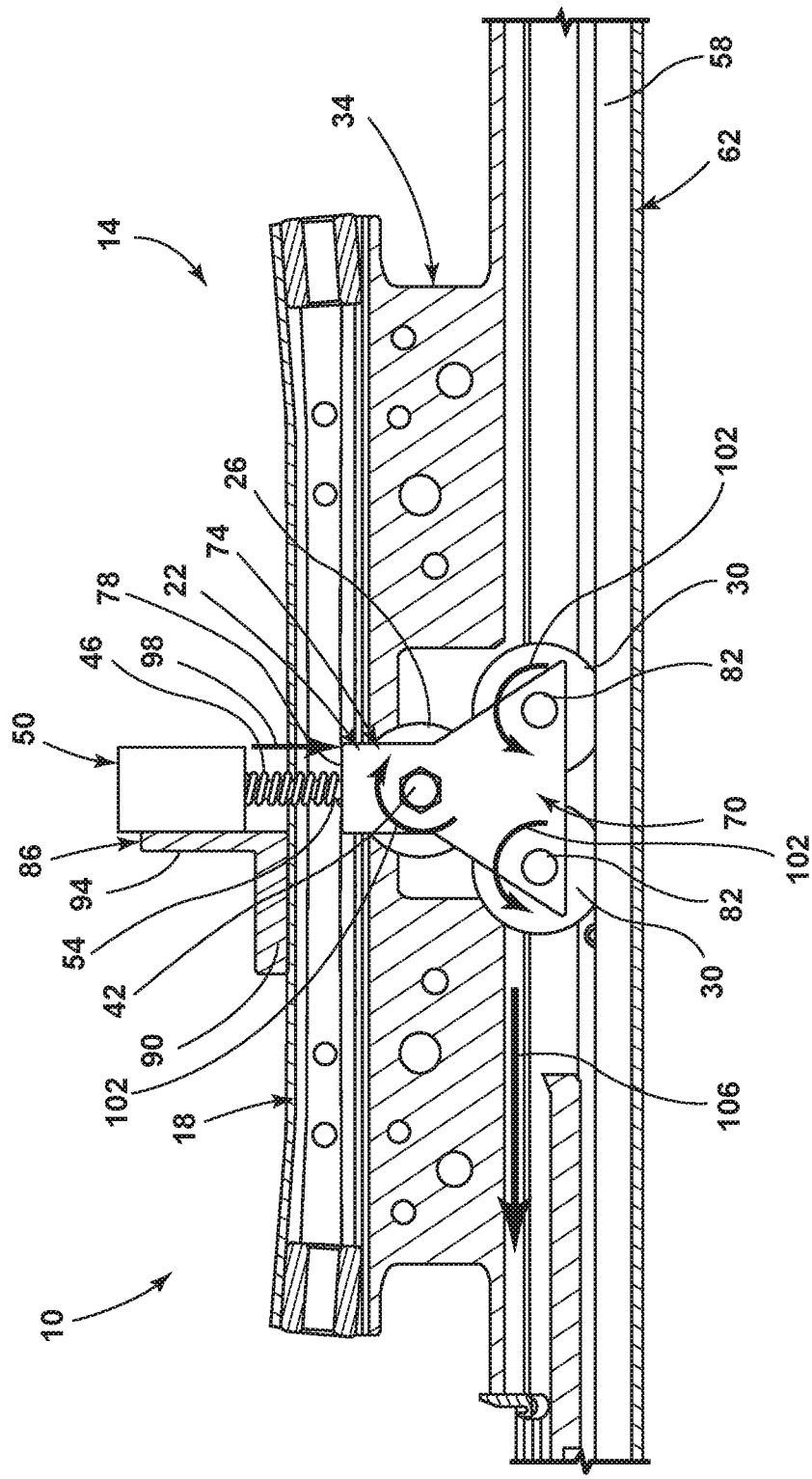
FIG. 4 is a cross-sectional view of the cassette, the rail system, and the motor, taken along line III-III of FIG. 2, illustrating an interaction between the drive wheel and the plurality of passive wheels for inducing lateral motion of the cassette.

For purposes of description herein, the terms "upper," "lower," "right," "left," "rear," "front," "vertical," "horizontal," and derivatives thereof shall relate to the concepts as oriented in FIG. 4. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a translation assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-6, reference numeral 10 generally designates a vehicle. The vehicle 10 can include a cabin 14 that defines an interior of the vehicle 10. A translation assembly 18 includes a mounting bracket 22 that couples a drive wheel 26 and one or more passive wheels 30 to a cassette 34. A motor 38 is coupled to a drive shaft 42 of the drive wheel 26. In various examples, a biasing member 46 is coupled between the cassette 34 and the mounting bracket 22 such that the drive wheel 26 and the one or more passive wheels 30 maintain physical contact with one another. In some examples, a solenoid 50 is fixed to the cassette 34 and includes a pin 54 that engages with the mounting bracket 22 and/or the drive wheel 26. The pin 54 is operable to adjust friction between the drive wheel 26 and the one or more passive wheels 30.

Referring again to FIGS. 1 and 2, the translation assembly 18 can engage with tracks 58 of a rail system 62. The tracks 58 may be generally C-shaped such that an upper portion of the track 58 defines a slot 66 that the translation assembly 18 can extend out of while the translation assembly 18 remains engaged with an interior of the track 58. In various examples, the tracks 58 may be mounted or otherwise coupled to a floor of the vehicle 10 to provide guides for the translation assembly 18 to traverse various regions of the cabin 14. The rail system 62 may extend in longitudinal, lateral, angular, and/or diagonal directions within the cabin 14 such that the components that are coupled to the translation assembly 18 are capable of assuming various configurations, orientations, and/or positions within the vehicle 10. The components that are coupled to the translation assembly 18, for example, by the cassette 34, can include, but are not limited to seating assemblies, storage units, consoles, occupant support assemblies, cargo support assemblies, and the like. In some examples, the vehicle 10 may be a motor vehicle, such as a land vehicle, a watercraft, an airborne vehicle, an automobile, a boat, an airplane, or the like. According to various examples, the vehicle 10 may be driver-controlled, semi-autonomous, fully-autonomous, or any combination of user-controlled and automated. For example, the semi-autonomous example of the vehicle 10 may perform many or all-commuting functions (e.g., accelerating, braking, turning, signaling, etc.) independent of user interaction while the user maintains override control of the vehicle 10.

Figure 1:
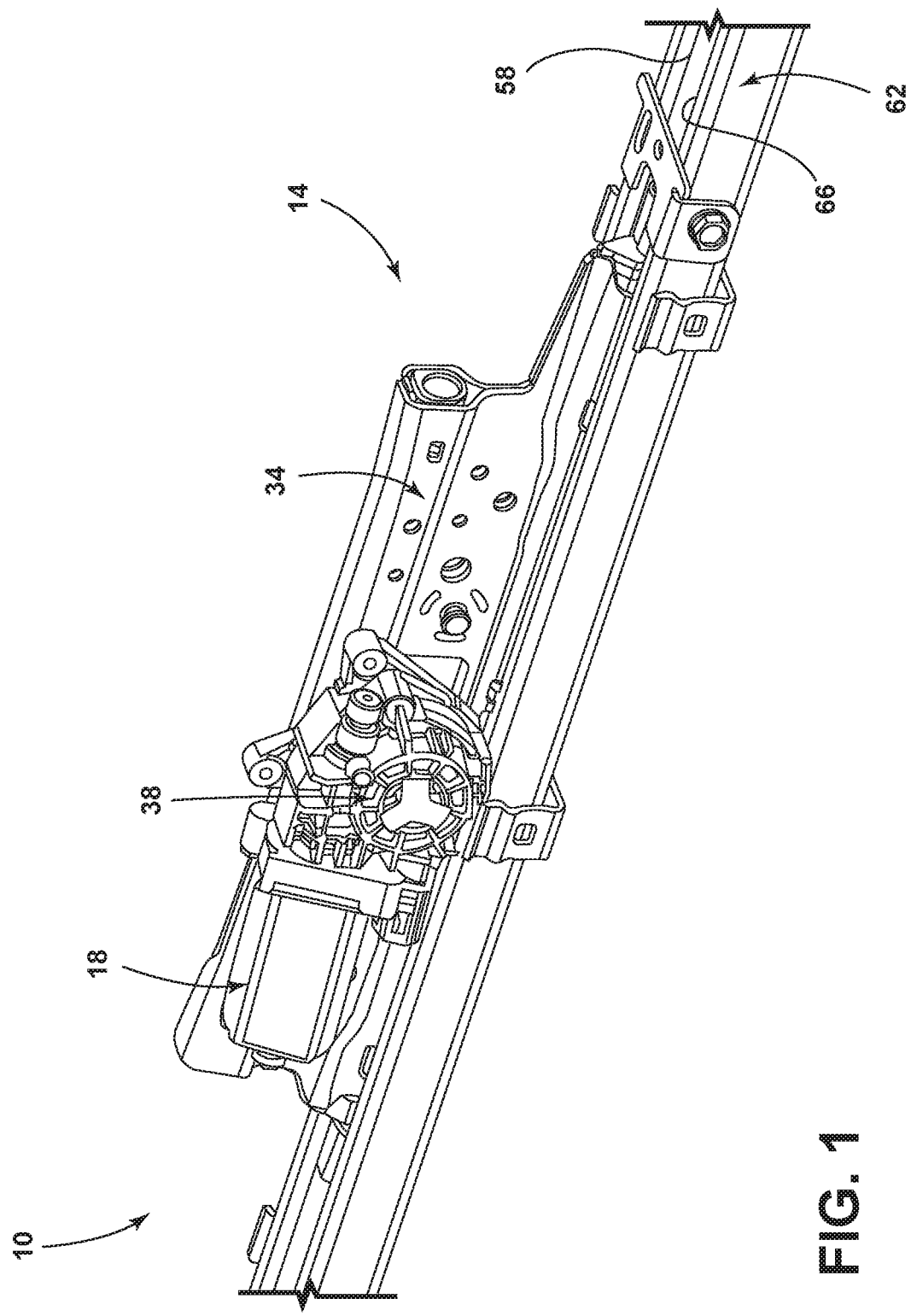
FIG. 1 is a side perspective view of a cassette coupled to a rail system, illustrating a motor coupled thereto.
Figure 2:
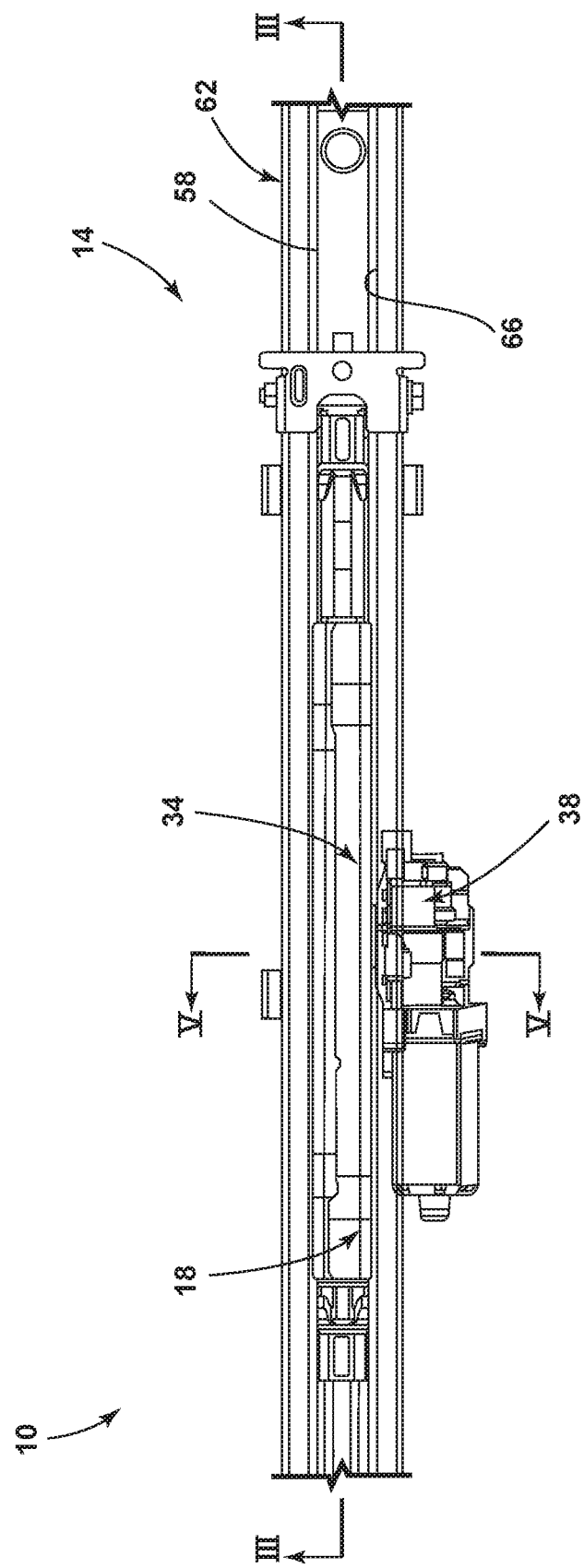
FIG. 2 is a top view of the cassette coupled to the rail system.
Figure 3:
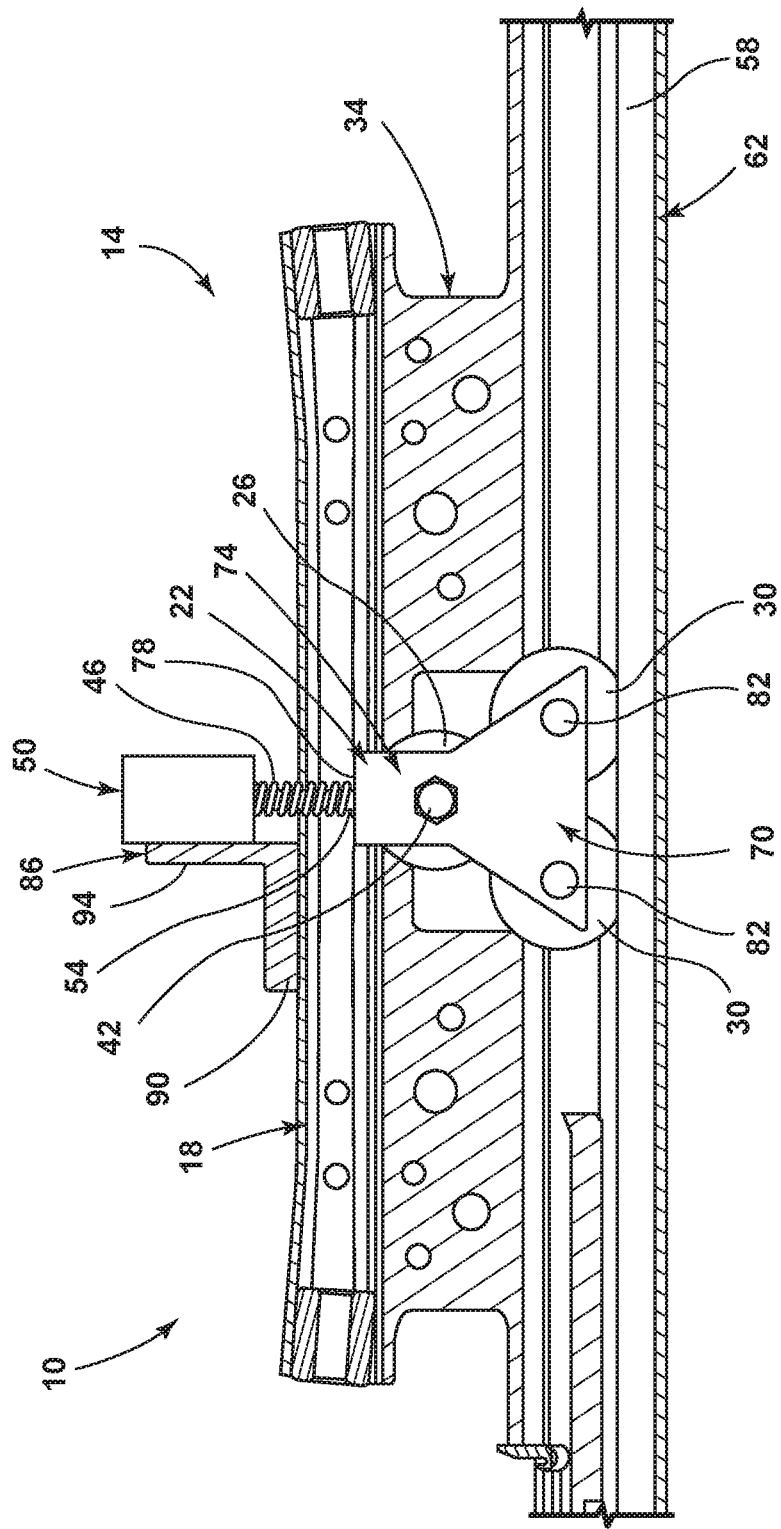
FIG. 3 is a cross-sectional view of the cassette, the rail system, and the motor, taken along line III-III of FIG. 2, illustrating a drive wheel and a plurality of passive wheels.

Referring now to FIGS. 3 and 4, the passive wheels 30 engage with the tracks 58 of the rail system 62 such that the passive wheels 30 can be rotated to induce translational motion of the translation assembly 18 within the tracks 58. Said another way, rotational motion of the passive wheels 30 induces lateral or horizontal motion of the entire translation assembly 18 along the tracks 58 of the rail system 62. In the depicted example, the drive wheel 26 is centrally positioned above two of the passive wheels 30. Accordingly, the arrangement of the drive wheel 26 and the passive wheels 30 takes on a generally triangular shape with the drive wheel 26 contacting adjacent quadrants of the passive wheels 30. For example, the drive wheel 26 can contact an upper right quadrant of one of the passive wheels 30 and an upper left quadrant of the other of the passive wheels 30. The arrangement of the drive wheel 26 and the passive wheels 30 may dictate, at least to some extent, the shape and/or contour of the mounting bracket 22. For example, the mounting bracket 22 depicted is provided with a generally triangular shape, particularly in a lower region 70 of the mounting bracket 22, and a generally rectangular shape in an upper region 74 of the mounting bracket 22. Accordingly, the mounting bracket 22 may be provided as a polygon that couples the drive wheel 26 and the one or more passive wheels 30 together as an assembly or operable unit. It may be beneficial for the upper region 74 to be provided with a rectangular shape or another shape that provides a bearing surface 78 for the biasing member 46 and/or the pin 54 to engage with. In some examples, the mounting bracket 22 may be a triangular suspension, truss-based housing or structure.

Referring again to FIGS. 3 and 4, the drive wheel(s) 26 and the one or more passive wheels 30 are each coupled to the mounting bracket 22 by an axle 82. The axle 82 for the drive wheel 26 may be referred to as the drive shaft 42. The drive shaft 42 is engaged by the motor 38 (FIG. 1) such that the motor 38 can induce rotational motion of the drive shaft 42. The drive wheel 26 can be coupled to the drive shaft 42 (e.g., fixedly coupled) in a manner that permits the rotational motion from the drive shaft 42 to be transmitted into rotational motion of the drive wheel(s) 26. In various examples, the drive shaft(s) 42 and/or the axles 82 may have a generally round or cylindrical cross-section, as taken perpendicular to the axis of rotation. In some examples, the cross-section of the drive shaft(s) 42 may be a polygon that is not generally cylindrical or round. In such examples, the drive shaft(s) 42 may have cross-sections that are perpendicular to the axis of rotation that are generally triangular, generally rectangular, generally pentagonal, generally hexagonal, and so on. By providing the drive shaft(s) 42 with a cross-section that is not generally round or cylindrical, the drive shaft(s) 42 may be provided with a plurality of faces that can be engaged with a complementary aperture in the drive wheel 26 and/or the motor 38 such that transmission of the rotational motion from the motor 38 to the drive wheel(s) 26 can be accomplished without fixedly coupling the drive shaft 42 to the drive wheel 26 and/or the motor 38. Rather, the drive shaft(s) 42 may be coupled to the drive wheel 26 and/or the motor 38 by way of an interference fit and/or a fastener (e.g., a nut that engages with threads on the drive shaft 42). Accordingly, the drive shaft 42 may be replaced or otherwise serviced in the event the drive shaft 42 becomes inoperable through normal wear and tear but the remainder of, or a substantial portion of, the translation assembly 18 remains operable or usable. It is contemplated that the drive shaft 42 may undergo a large amount of stress as torque from the motor 38 is imposed on the drive shaft 42 and a resistance to the rotational motion imparted by the motor 38 is provided by the friction established by the drive wheel 26 interacting with the one or more passive wheels 30 and a weight applied by a component coupled to the translation assembly 18.

Referring yet again to FIGS. 3 and 4, the solenoid 50 may be fixedly coupled to the cassette 34 by a solenoid bracket 86. In the depicted example, the solenoid bracket 86 is an L-shaped or right-angle bracket that includes a cassette arm 90 and a solenoid arm 94. The cassette arm 90 couples to the cassette 34 and the solenoid arm 94 couples to the solenoid 50. The pin 54 extends from the solenoid 50 and can engage with either or both the mounting bracket 22 and/or the drive wheel 26. In the depicted example, the biasing member 46 extends between the solenoid 50 and the mounting bracket 22 such that a constant force is applied between the solenoid 50 and the mounting bracket 22 that biases the mounting bracket 22 away from the solenoid 50. The force applied by the biasing member 46 may be referred to as a biasing force 98. The biasing force 98 can be constant and is utilized during normal operation of the translation assembly 18 to maintain physical contact between the drive wheel(s) 26 and the one or more passive wheels 30 such that rotational motion of the drive wheel(s) 26 is transmitted to the one or more passive wheels 30 and lateral motion of the translation assembly 18 within the tracks 58 is induced. In some examples, the one or more passive wheels 30 may be coupled to the mounting bracket 22 with some tolerance or some degree of vertical mobility relative to the mounting bracket 22 such that the biasing force 98 results in a downward actuation of the mounting bracket 22, which in turn takes-up any slack or gap between the drive wheel(s) 26 and the one or more passive wheels 30 and thereby results in the maintenance of physical contact between the drive wheel(s) 26 and the one or more passive wheels 30. Additionally or alternatively, a weight of the translation assembly 18, the cassette 34, and or the component coupled thereto may aid in the maintenance of physical contact between the drive wheel(s) 26 and the one or more passive wheels 30. For example, the axles 82 of the one or more passive wheels 30 may be mounted to the mounting bracket 22 by engagement with elongated slots rather than more narrow apertures.

Referring further to FIGS. 3 and 4, in various examples, the one or more passive wheels 30 may be mounted to the mounting bracket 22 in a manner that does not permit vertical actuation of the one or more passive wheels 30 relative to the mounting bracket 22. In such examples, the arrangement of the drive wheel(s) 26 and the one or more passive wheels 30 may be positioned such that physical contact is maintained between the drive wheel(s) 26 and the one or more passive wheels 30. However, the biasing force 98 may still be applied by the biasing member 46 in such examples to take-up any tolerances that have been provided in the manufacturing process and ensure sufficient contact between the drive wheel(s) 26 and the one or more passive wheels 30. In the depicted example, the biasing member 46 is a coil spring that surrounds the pin 54 of the solenoid 50. However, the present disclosure is not so limited. In some examples, the pin 54 engages with the bearing surface 78 of the mounting bracket 22 and the pin 54 is operable between a retracted position and an extended position. When the pin 54 is in the retracted position, the drive wheel 26 and the one or more passive wheels 30 are free to rotate and induce translational motion of the translation assembly 18 within the tracks 58, while the biasing force 98 may ensure adequate physical contact between the drive wheel(s) 26 and the one or more passive wheels 30 to accomplish the translational motion. When the pin 54 is in the extended position, the mounting bracket 22 may be forced toward the track 58 (e.g., in a vertically downward direction) such that a coefficient of friction (e.g., static friction or dynamic friction) between the drive wheel(s) 26 and the one or more passive wheels 30 is increased. The coefficient of friction may be increased by the extension of the pin 54 to an extent that unintended lateral motion of the translation assembly 18 within the tracks 58 is prevented. For example, the coefficient of friction may be increased by the extension of the pin 54 to the extent that lateral motion within the tracks 58 is prevented during a dynamic event. The dynamic event can include, but is not limited to, a vehicle-to-vehicle impact event, a cargo-to-translation-assembly impact event, a user or occupant shifting their weight, shifting of weight of a cargo item stored in a storage component that is coupled to the translation assembly 18, and so on.

Referring still further to FIGS. 3 and 4, the drive wheel 26 may be rotated in clockwise and counter-clockwise directions such that the translation assembly 18 can be moved in forward and rearward directions within the tracks 58 relative to a current position of the translation assembly 18. While referred to as forward and rearward directions, the translation assembly 18 is not limited to fore and aft adjustments within the vehicle 10. Rather, the forward and rearward directions are meant to refer to motion of the translation assembly 18 within the tracks 58 relative to a current or immediately previous position of the translation assembly 18. Accordingly, the forward and rearward directions are meant to convey that the translation assembly 18 is not limited to unidirectional motion within the tracks 58, but is instead capable of at least bidirectional motion within the tracks 58, as induced by clockwise or counter-clockwise rotation of the drive wheel 26. Similarly, the axles 82 of the one or more passive wheels 30 are not directly coupled to any gearing or locking assemblies that prevent the one or more passive wheels 30 from rotating in the direction that is induced by the drive wheel 26. Said another way, the one or more passive wheels 30 are free to rotate in clockwise and counter-clockwise directions depending on the direction of rotation of the drive wheel 26. In various examples, the drive wheel 26 and the one or more passive wheels 30 can be arranged in a counter-rotating arrangement. For example, rotation of the drive wheel 26 in one of a clockwise and a counter-clockwise direction induces rotation of the one or more passive wheels 30 in the other of the clockwise and the counter-clockwise direction. Such a counter-rotating example is indicated in FIG. 4 by angular rotation arrows 102. The direction of angular rotation of the one or more passive wheels 30 may dictate a direction of lateral traversal of the translation assembly 18. For example, as depicted in FIG. 4, when the drive wheel 26 rotates in a clockwise direction, the one or more passive wheels 30 are induced to rotate in a counter-clockwise rotation. The counter-clockwise rotation of the one or more passive wheels 30 results in an actuation of the translation assembly 18 along the track 58 towards a left side of FIG. 4, as indicated by translation arrow 106.

Figure 5:
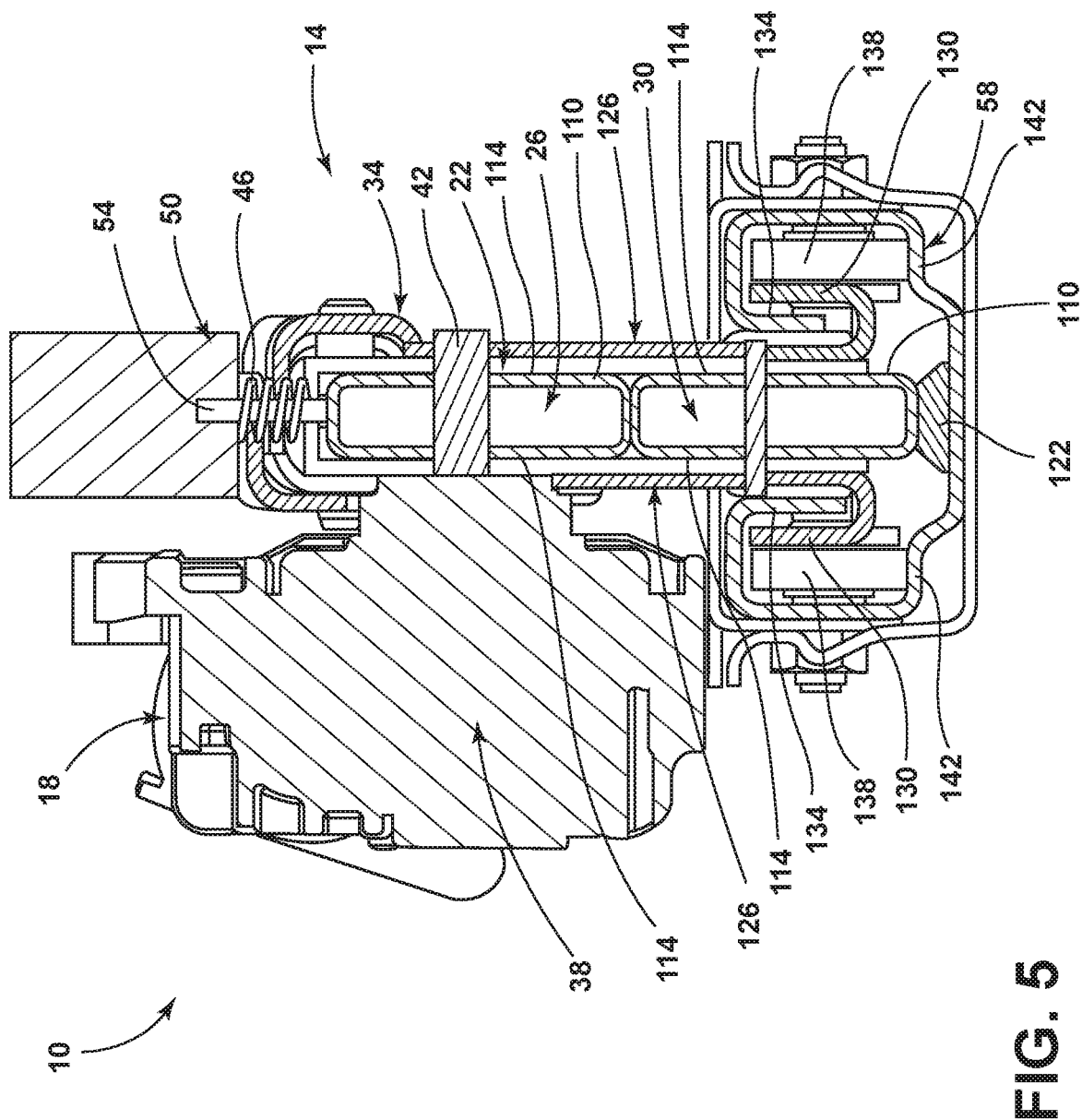
FIG. 5 is a cross-sectional view of the cassette, the rail system, and the motor, taken along line V-V of FIG. 2, illustrating an interaction between the drive wheel, the plurality of passive wheels, the rail system, and the motor, according to one example.
Figure 6:
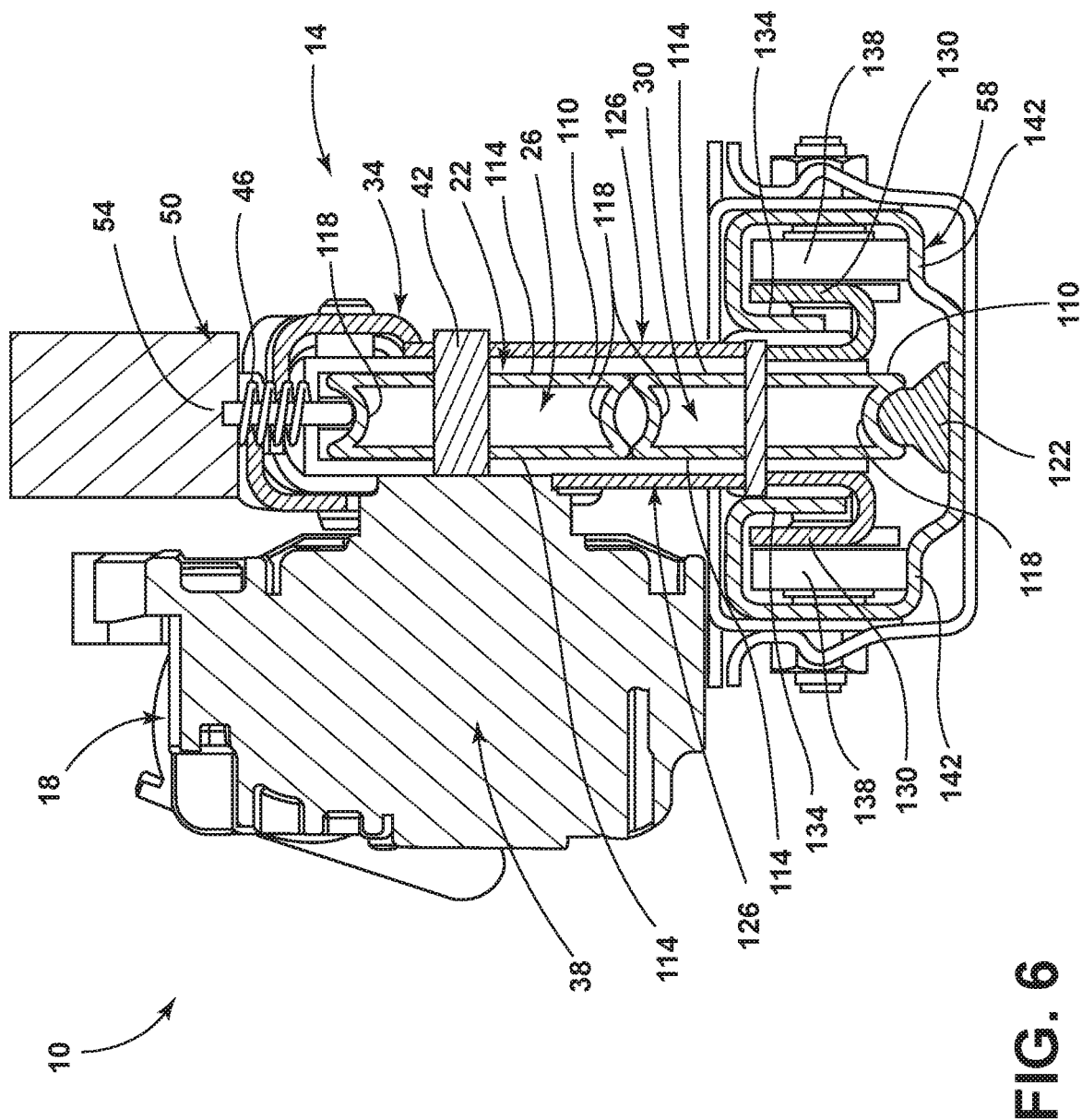
FIG. 6 is a cross-sectional view of the cassette, the rail system, and the motor, taken along line V-V of FIG. 2, illustrating an interaction between the drive wheel, the plurality of passive wheels, the rail system, and the motor, according to another example.

Referring to FIGS. 5 and 6, the pin 54 is operable between extended and retracted positions to adjust a level of friction between the drive wheel 26 and the one or more passive wheels 30. When the pin 54 is in the extended position, the pin 54 can contact either the bearing surface 78 of the mounting bracket 22 or a surface of the drive wheel 26. In the depicted examples, the pin 54 contacts the surface of the drive wheel 26 when the pin 54 is in the extended position. When the pin 54 is in the extended position, the pin 54 may cause an increase in the friction between the drive wheel 26 and the one or more passive wheels 30 such that the cassette 34 is maintained in a stationary position relative to a surface that the one or more passive wheels 30 rest upon (e.g., the track 58). The pin 54 may also provide a physical barrier to rotation of the drive wheel 26. The surface of the drive wheel 26 and the one or more passive wheels 30 may be provided with a coating 110. In one example, the coating 110 that is provided on the surfaces of the drive wheel 26 and the one or more passive wheels 30 may be a rubberized coating. The coating 110 may be applied to, or provided on, a majority of a perimeter of the drive wheel 26 and the one or more passive wheels 30. Alternatively, the coating 110 may be a applied to, or provided on, primarily regions of the surfaces of the drive wheel 26 and the one or more passive wheels 30 that will come into direct physical contact with one another. In various examples, a static coefficient of friction between the contact surfaces of the drive wheel(s) 26 and the one or more passive wheels 30 (e.g., rubberized contact surfaces) may be greater than about 0.8, greater than about 0.9, greater than about 1.0, greater than about 1.1, greater than about 1.2, and/or combinations or ranges thereof.

Referring again to FIGS. 5 and 6, the drive wheel 26 and the one or more passive wheels 30 may be generally cylindrical in shape. In some examples, the drive wheel(s) 26 and the one or more passive wheels 30 may have contact surfaces that extend between sides 114 of the drive wheel(s) 26 and the one or more passive wheels 30 such that the contact surfaces are substantially perpendicular to the sides 114 (see FIG. 5). In various examples, the drive wheel(s) 26 and the one or more passive wheels 30 may have contact surfaces that extend between the sides 114 of the drive wheel(s) 26 and the one or more passive wheels 30 such that the contact surfaces are substantially arcuate relative to the sides 114 (see FIG. 6). In examples where the drive wheel(s) 26 and the one or more passive wheels 30 have contact surfaces that are substantially arcuate, the arcuate portion may be referred to as a groove 118. The groove 118 may be provided with a radially beveled contour to maximize a surface area of contact with an internal drive-rail provided in the tracks 58. In either the examples where the contact surfaces are substantially perpendicular to the sides 114 or the examples where the groove 118 is provided, the contact surfaces of the one or more passive wheels 30 may engage with a traction rib 122 that is coupled to the track 58. The traction rib 122 may be the internal drive-rail mentioned above and may provide a base for a friction-based braking system by way of the coated passive wheel(s) 30. The traction rib 122 may be made from the same material, or coated with the same material, as the coating 110 on the one or more passive wheels 30. Accordingly, the one or more passive wheels 30 may be provided with a surface to engage with that has high frictional characteristics such that the one or more passive wheels 30 can confidently grip the traction rib 122, particularly during dynamic events and translational movements. In general, the traction rib 122 can be contoured in a complimentary fashion to the contact surface(s) of the one or more passive wheels 30 such that a contact surface area between the traction rib 122 and the contact surface(s) of the one or more passive wheels 30 covers a substantial portion of the contact surface(s) of the one or more passive wheels 30 that are engaged with the traction rib 122 at a given time. For example, the traction rib 122 may be provided with a tapered point that transitions into beveled sides as a proximity to a mounting surface with the track 58 is approached. Accordingly, a surface area of contact between the groove 118 and the traction rib 122 may be maximized. In various examples, the traction rib 122 may be provided with a degree of compliance such that the traction rib 122 deforms to some extent upon engagement with the passive wheels 30 and the application of the associated weight of the component that is coupled to the cassette 34. The degree of compliance of the traction rib 122 can allow the traction rib 122 to maintain a more continuous surface area of contact with the passive wheels 30.

Referring further to FIGS. 5 and 6, the cassette 34 can be contoured to actively retain the cassette 34 to the track 58. For example, arcuate arms 126 of the cassette 34 may be generally J-shaped with ends 130 that are up-turned. The ends 130 of the arcuate arms 126 can be received by arcuate regions 134 of the track 58. The arcuate regions 134 of the track 58 can both guide and retain the cassette 34 once the cassette 34 has been coupled to the tracks 58 of the rail system 62. Rollers 138 may be coupled to the ends 130 of the arcuate arms 126. The rollers 138 are free to rotate about a coupling portion, such as an axle, that couples and retains the rollers 138 to the arcuate arms 126 of the cassette 34. The rollers 138 may provide additional stability to the translation assembly 18 by engaging with, or riding along, raised sections 142 of the track 58.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A translation assembly, comprising:
    a mounting bracket that couples a drive wheel and one or more passive wheels to a cassette;
    a motor coupled to a drive shaft of the drive wheel; and
    a biasing member coupled between the cassette and the mounting bracket such that the drive wheel and the one or more passive wheels maintain physical contact with one another.

2. The translation assembly of claim 1, further comprising:
    a solenoid fixed to the cassette and having a pin that engages with the mounting bracket.

3. The translation assembly of claim 2, wherein the pin is operable to adjust friction between the drive wheel and the one or more passive wheels.

4. The translation assembly of claim 3, wherein the pin is operable between extended and retracted positions to adjust friction between the drive wheel and the one or more passive wheels.

5. The translation assembly of claim 4, wherein the extended position of the pin increases the friction between the drive wheel and the one or more passive wheels such that the cassette is maintained in a stationary position relative to a surface the one or more passive wheels rest upon.

6. The translation assembly of claim 2, wherein the biasing member is a coil spring that surrounds the pin of the solenoid.

7. The translation assembly of claim 1, wherein rotation of the drive wheel in one of a clockwise and a counter-clockwise direction induces rotation of the one or more passive wheels in the other of the clockwise and the counter-clockwise direction.

8. The translation assembly of claim 7, wherein the direction of rotation of the one or more passive wheels dictates a direction of lateral traversal of the translation assembly.

9. The translation assembly of claim 1, wherein the cassette is coupled to a seating assembly.

10. The translation assembly of claim 1, wherein the cassette is coupled to a component of a cabin of a vehicle.

11. The translation assembly of claim 1, wherein the drive wheel and the one or more passive wheels are provided with a rubberized coating on surfaces thereof.

12. The translation assembly of claim 11, wherein a static coefficient of friction between the rubberized coating on the surface of the drive wheel and the rubberized coating on the surface of the one or more passive wheels is greater than about 1.0.

13. A translation assembly, comprising:
a mounting bracket that couples a drive wheel and one or more passive wheels to a cassette;
a motor coupled to a drive shaft of the drive wheel; and
a solenoid fixed to the cassette and having a pin that engages with the mounting bracket, the pin being operable to adjust friction between the drive wheel and the one or more passive wheels.

14. The translation assembly of claim 13, wherein the pin is operable between extended and retracted positions to adjust the friction between the drive wheel and the one or more passive wheels.

15. The translation assembly of claim 13, further comprising:
a biasing member coupled between the cassette and the mounting bracket.

16. The translation assembly of claim 15, wherein the biasing member ensures that physical contact is maintained between the drive wheel and the one or more passive wheels.

17. The translation assembly of claim 4, wherein the extended position of the pin increases the friction between the drive wheel and the one or more passive wheels such that the cassette is maintained in a stationary position relative to a surface the one or more passive wheels rest upon.

18. A translation assembly, comprising:
a mounting bracket that couples a drive wheel and one or more passive wheels to a cassette;
a motor coupled to a drive shaft of the drive wheel;
a solenoid fixed to the cassette and having a pin that is movable and engages with the mounting bracket, the pin operable between extended and retracted positions; and
a biasing member coupled between the cassette and the mounting bracket such that the drive wheel and the one or more passive wheels maintain physical contact with one another.

19. The translation assembly of claim 18, wherein rotation of the drive wheel in one of a clockwise and a counter-clockwise direction induces rotation of the one or more passive wheels in the other of the clockwise and the counter-clockwise direction, and wherein the direction of rotation of the one or more passive wheels dictates a direction of lateral traversal of the translation assembly.

20. The translation assembly of claim 18, wherein the extended position of the pin increases the friction between the drive wheel and the one or more passive wheels such that the cassette is maintained in a stationary position relative to a surface the one or more passive wheels rest upon.

* * * * *